(12) United States Patent
Beitle et al.

(10) Patent No.: US 8,201,090 B2
(45) Date of Patent: Jun. 12, 2012

(54) USER INTERFACE FOR SOFTWARE APPLICATIONS

(75) Inventors: Robert R. Beitle, Fayetteville, AR (US); Noel Romey, Cabot, AR (US); Steven Setzer, Rogers, AR (US); H. Michael Cheung, Hudson, OH (US)

(73) Assignee: The Board of Trustees of the University of Arkansas, Little Rock, AR (US)

( * ) Notice: Subject to any disclaimer, the term of this patent is extended or adjusted under 35 U.S.C. 154(b) by 823 days.

(21) Appl. No.: 12/269,965

(22) Filed: Nov. 13, 2008

(65) Prior Publication Data

US 2009/0217164 A1    Aug. 27, 2009

Related U.S. Application Data

(60) Provisional application No. 61/002,873, filed on Nov. 13, 2007.

(51) Int. Cl.
*G06F 3/01* (2006.01)
*G06F 3/00* (2006.01)

(52) U.S. Cl. ........ 715/702; 434/112; 715/753; 715/751; 715/752; 715/755

(58) Field of Classification Search .................. 715/702, 715/865, 763, 771; 341/21, 20; 434/112, 434/117; 345/173; 438/612; 427/272, 282
See application file for complete search history.

(56) References Cited

U.S. PATENT DOCUMENTS

| | | | |
|---|---|---|---|
| 4,914,624 A | 4/1990 | Dunthorn | |
| 5,412,189 A | 5/1995 | Cragun | |
| 5,714,978 A | 2/1998 | Yamanaka et al. | |
| 5,736,978 A | 4/1998 | Hasser et al. | |
| 6,029,214 A | 2/2000 | Dorfman et al. | |
| 6,059,575 A | 5/2000 | Murphy | |
| 6,140,913 A | 10/2000 | Okada et al. | |
| 6,384,743 B1 | 5/2002 | Vanderheiden | |
| 6,762,749 B1* | 7/2004 | Gouzman et al. | 345/163 |
| 7,106,220 B2 | 9/2006 | Gourgey et al. | |
| 7,184,032 B2 | 2/2007 | Stohrer et al. | |
| 7,453,442 B1* | 11/2008 | Poynter | 345/173 |
| 2002/0003469 A1* | 1/2002 | Gupta | 340/407.1 |
| 2003/0030628 A1* | 2/2003 | Sato et al. | 345/173 |
| 2003/0071859 A1* | 4/2003 | Takami et al. | 345/865 |
| 2003/0122689 A1* | 7/2003 | Romeo et al. | 341/21 |
| 2004/0117333 A1* | 6/2004 | Voudouris et al. | 706/13 |
| 2006/0256090 A1 | 11/2006 | Huppi | |

* cited by examiner

*Primary Examiner* — Mark Rinehart
*Assistant Examiner* — Toan Vu
(74) *Attorney, Agent, or Firm* — J. Charles Dougherty

(57) ABSTRACT

A user interface for software applications enables the full use of graphical user interface (GUI) software, particularly engineering design software, by visually impaired individuals. The interface combines tactile representations of graphical elements, non-visual cues, and a hardware element to allow the effective placement and interconnection of graphic elements using design software.

9 Claims, 3 Drawing Sheets

USER INTERFACE FOR SOFTWARE APPLICATIONS

CROSS-REFERENCE TO RELATED APPLICATIONS

This application claims the benefit of U.S. provisional patent application Ser. No. 61/002,873, entitled "Multifaceted User Interface for Software Applications," filed on Nov. 13, 2007. The complete disclosure of such provisional patent application is incorporated by reference herein.

STATEMENT REGARDING FEDERALLY SPONSORED RESEARCH OR DEVELOPMENT

This invention was made with U.S. Government support under the terms of grant numbers 0405382 and 0533208 from the National Science Foundation. The U.S. Government has certain rights in the invention.

BACKGROUND OF THE INVENTION

1. Field of the Invention

The present invention relates to computer interfaces, in particular to tactile-based user interfaces suited for use by visually impaired computer users, and more particularly for use by visually impaired engineers and engineering students in connection with engineering design software.

2. Brief Description of the Related Art

The ability to use the techniques, skills, and modern engineering tools necessary for engineering practice is an important requirement for engineering student education and graduation. Germane to this outcome is the use of simulation software, for such software represents a key engineering tool that students must master to practice engineering in the modern world. For example, chemical engineers use process simulation software to solve material and energy balances for proposed manufacturing schemes, or to analyze current processes for the application of possible improvements (i.e., "de-bottlenecking"). Examples of software used by chemical engineers for this purpose include PRO/II by Simulation Sciences, Inc.; ASPEN by ASPEN Technology, Inc.; and CHEMCAD by Chemstations, Inc. Each of these software packages function in a generally similar fashion, and familiarity with one confers a transferable knowledge base to operate another, provided that the basic input/output (I/O) routines are understood. Choices of components and flow rates, thermodynamic methods, unit operations, and unit connectivity are provided by the user as input, and the calculation engine then performs the material and energy balance, sizes or rates equipment, and in some cases provides an estimate of the capital investment associated with a design or improvement.

Recent advances in simulation software design have moved from text-based (i.e., keyword and programming language code) input to Graphical User Interfaces (GUIs). GUIs are exceptionally attractive to professors because they allow for a significant time savings during student training. Simply put, classroom exercises are freed of debugging the keyword syntax required to run the calculation engine. Since pointing and clicking generates the code, presumably more time is spent understanding the chemical process being studied and how it may be correctly designed or improved. For example, the simulation of a facility to produce ethylene oxide described in the popular design textbook Analysis, Synthesis, and Design of Chemical Processes may be built with a GUI by dragging twenty-three appropriate unit operation icons to a design palette, indicating connectivity with lines between icons, filling in appropriate drop-down menus, and then pushing the run button. This generates approximately 200 lines of keyword code by PRO/II, for example, which is then processed through the calculation engine. Entry of this code by hand would take considerably longer than implementing this design using the GUI provided by the software.

One may consider, however, the difficulty associated with using a GUI if a person has limited or no vision. Classroom activities must obviously accommodate this student in order for the student to succeed. Two avenues exist for student accommodation: (i) falling back, so to speak, to the exclusive use of keyword files, or (ii) adapting the I/O routine of the software package. The inventors of the present invention believe that completely circumventing the use of a GUI may not be a viable long-term option for a visually impaired student. The overall requirement of providing instruction for all design students makes the use of GUIs invaluable. It is the inventors' understanding, however, that in order for a federally funded university to be in compliance with section 504 of the Vocational Rehabilitations Act of 1973 (Public Law 93-112), accommodations must be made for all qualified students. Although the visually impaired student could work solely with text-based code, the quality of modern instruction would be sorely compromised for several reasons. First, the time allotted to creative exercises would be diminished to allow for the writing and debugging of keyword files. Second, avoiding GUIs conflicts with the appropriate training outcome. Third, the creation of a separate and distinct educational track for the visually impaired student only delays the inevitable difficulties that will faced by the visually impaired engineering student when that student faces real-world engineering tasks as a practicing engineer. Since the visually impaired student would function in a group setting with sighted team members, a disparity would exist simply because sighted engineers and visually impaired engineers would approach process simulation differently. Those able to employ a GUI would arguably try more possible solutions, whereas those constrained to keyword code may examine fewer scenarios, perhaps resulting in a sub-optimal solution to a particular engineering problem. Such scenarios are clearly not acceptable in modern chemical engineering education and practice.

The art includes a number of attempts to make various types of computer software packages usable by those persons with impaired vision. In particular, there are several methods used by educators of the visually impaired to convey scientific or mathematical content using software. These techniques typically require some visual acuity to produce material for the student. The "one-way" techniques include complicated and costly methods, such as Pictures In A Flash (PIAF), provided by Quantum Technology of Sydney, Australia, and more simple methods, such as raised-line drawing kits, which are provided through numerous sources including Maxi-Aids, Inc. of Farmingdale, N.Y. PIAF, or "toasting" as it is routinely called, is a technique that transfers material from a master to swell paper using heat. First, an image is produced from material, be it handmade or graphic printout. The image is then transferred using a simple copy machine onto the swell paper, then raised by exposing the copy to a concentrated light source. PIAF is more costly because of the paper and light box, but can quickly prepare material for a student. At the opposite end of the cost spectrum is the raised-line drawing kit. Using this technique, an image is transferred to a thin acetate film by pressure. A stylus similar to those packaged with personal digital assistants (PDAs) is used to score the film, producing a line. PIAF and similar methods are considered "one way" in as much as a person with visual acuity is required and because they are not interactive; static representations of material (like graphs or diagrams) are produced for a student to interpret, but there is no means by which the student may manipulate those materials directly.

Screen-reading software is a second technique for allowing the visually impaired to interact with computer software. Although digital access has evolved and developed over the years, the basic idea of using screen-reading software dates back to the days of early personal computing, and has remained generally the same since that time. Screen readers have long existed (examples include TextTalker for the Apple II, and VocalEyes for personal computers running the Microsoft DOS operating system) that were able to vocalize the screen content as new information was printed to it in a line-by-line fashion. Since an application only had text strings and numerical values as input or output, manipulating information was relatively easy. Though graphics did exist and limited GUIs were available, the main media by which information was conveyed was text based, due to the limited computer power that was then available.

With faster processors, more memory, and cheaper storage media, GUIs became more profitable to build, maintain, and run on desktop computers. Pointing and clicking is the current standard by which I/O is achieved. Microsoft introduced the Windows operating system, generating selection pressure towards the creation of "attractive" software relying on GUIs. Since visually impaired users were required to manipulate GUIs, utility programs were created that could coherently read graphical information on the screen. Starting in 1997, Microsoft's Active Accessibility (MSAA) team built and continues to build special tools, APIs (Application Programming Interfaces), and accessibility standards into the Windows operating system that allow leading screen reading packages (such as Jaws for Windows from Freedom Scientific, Inc., and WindowEyes from GwMicro, Inc.) to provide computing accessibility to visually impaired professionals. Unfortunately, the architecture of many GUI-based technical programs does not employ MSAA features. This creates a dilemma for visually impaired users. When one launches an application using non-standard controls (i.e., graphics, or unlabelled objects and buttons) that the screen reader cannot recognize or interpret via MSAA or through the Windows API, the blind person is plunged back into illiteracy. Such is the case, for example, with standard plant simulation software used by chemical engineers, such as CHEMCAD, ASPEN, or PRO/II. Although screen readers can interpret some aspects of the interface, many times there are crucial parts of the GUI that cannot be manipulated with screen-reading programs. One critical aspect of these interfaces includes connecting unit operations via point, click, and/or drag. These operations are essential for effective use of such software.

Another attempt to make software usable by those persons with visual impairment is by the use of imbedded audio cues. Non-visual cues, including audible cues may be imbedded in the software to mimic events normally indicated by visual cues, such as textual elements like a cursor shape change. Non-visual cues may include audible cues, such as spoken words or sounds, vibrations, kinetic, or any other cue that may be sensed. This strategy requires a willingness on the part of the software developer to adapt the software package. For users with only limited vision, the accurate location of screen items is difficult or in some cases impossible. To overcome these difficulties, distinct sounds may be introduced. For example, consider when a user is trying to indicate a stream connection from Unit A to Unit B. Conceptually, the user moves the cursor around the icon of Unit A and encounters an available port. When the port is found, a sound can be played to indicate successful capture of the port at either Unit A or Unit B. Sounds may also be used to indicate other functions as well. With the feedback of sounds, users with limited vision may be promptly informed of events that screen reading programs cannot indicate. The problem with this approach is that it requires the publisher of the software to imbed the audio cues in the software itself, making the adaptation of the software for the visually impaired difficult if this effort was not made when the software was written.

Finally, tactile representations may be used to locate and place GUI objects. Tactile representations may be as simple as a small sticker placed on a transparency or as complex as a stenciled analog of the icon being represented. A stencil may be designed to mimic the same size of the onscreen icon and provide the user with the needed level of detail to indicate connectivity. Without tactile representations, the inventors believe it is almost impossible to design a facility using the drop and click features of a GUI. Tactile representations alone, however, are believed to be insufficient to provide a complete representation of software functionality to facilitate effective use by a person who is visually impaired.

References mentioned in this background section are not admitted to be prior art with respect to the present invention. The limitations of the prior art are overcome by the present invention as described below.

BRIEF SUMMARY OF THE INVENTION

The inventors set forth with the goal of minimizing the differences between visually impaired and sighted persons with respect to their use of software, and in particular with the goal of assisting visually impaired engineering students in the use of modern engineering software. The inventors have achieved this goal through a combination of techniques that adapt I/O in a creative fashion. The invention results from a combination of screen-reading programs, non-visual cues, and tactile representations of GUI objects to provide access to modern simulation software for, in one preferred embodiment, a chemical engineering student. To the inventors' knowledge, this multifaceted approach has not been attempted with technical software packages.

It is therefore the goal of the present invention to provide an interface that allows a person with visual impairment to utilize modern software in a manner most closely analogous to the manner in which the software may be employed by a sighted person using GUIs.

These and other features, objects and advantages of the present invention will become better understood from a consideration of the following detailed description of the preferred embodiments and appended claim, in conjunction with the drawings as described following:

DETAILED DESCRIPTION OF THE PREFERRED EMBODIMENT(S)

In order to examine the effectiveness of combining screen reading, imbedded audio cues, and tactile representations to allow a visually impaired person to operate a GUI, the inventors utilized CHEMCAD version 5.5 in a preferred embodiment of the present invention. Although one script file for JAWS was written to provide for the reading of certain pop-up information boxes, most of the GUI features of CHEMCAD were accessed, or initiated, via the adaptations as described herein. A tablet PC, slate model M1200 available from Motion Computing of Austin, Tex., and equipped with a USB-connected keyboard, was employed in a preferred embodiment of the present invention. The visually impaired student used this system to design various chemical manufacturing schemes and several separation systems for a hydrocarbon mix.

As stated previously, chemical engineers today use plant simulation software that has a great dependency on GUIs. Although screen readers can inform the user of certain onscreen changes, automatically move the mouse to a predefined point, and duplicate certain mouse actions, it is impossible to tell the screen reader what to do or where to click if there is no a priori spatial knowledge. Such is the case when one is tasked with the design of a chemical plant in any GUI environment. As the screen reader cannot manipulate graphics alone, a method was needed to solve this problem.

At the center of the solution presented by the preferred embodiment of the present invention was the use of tactile representations layered above a hardware surface. Two options were considered for this element: an Iveo touchpad from ViewPlus Technologies, Inc. and a tablet PC. These two options were considered because each represented different means by which the pointing device is tracked, and point-and-click operations occur. Both options can register interactions at spatially distinct points on the surface. The Iveo touchpad's pointing device is the user's finger, while the table PC's pointing device is a special pen. With the Iveo touchpad, the user interacts with the computer via a USB-connected, letter-sized paper touchpad. When the user touches the touchpad, a mouse click occurs and is registered spatially. Outside of native Iveo applications, the inventors hereof found that the touchpad does not easily allow for drag-and-drop or selection using a mouse click plus sweep of an area. These shortcomings made design with the Iveo touchpad difficult with the native, current drivers provided with the touchpad.

Figure 1:
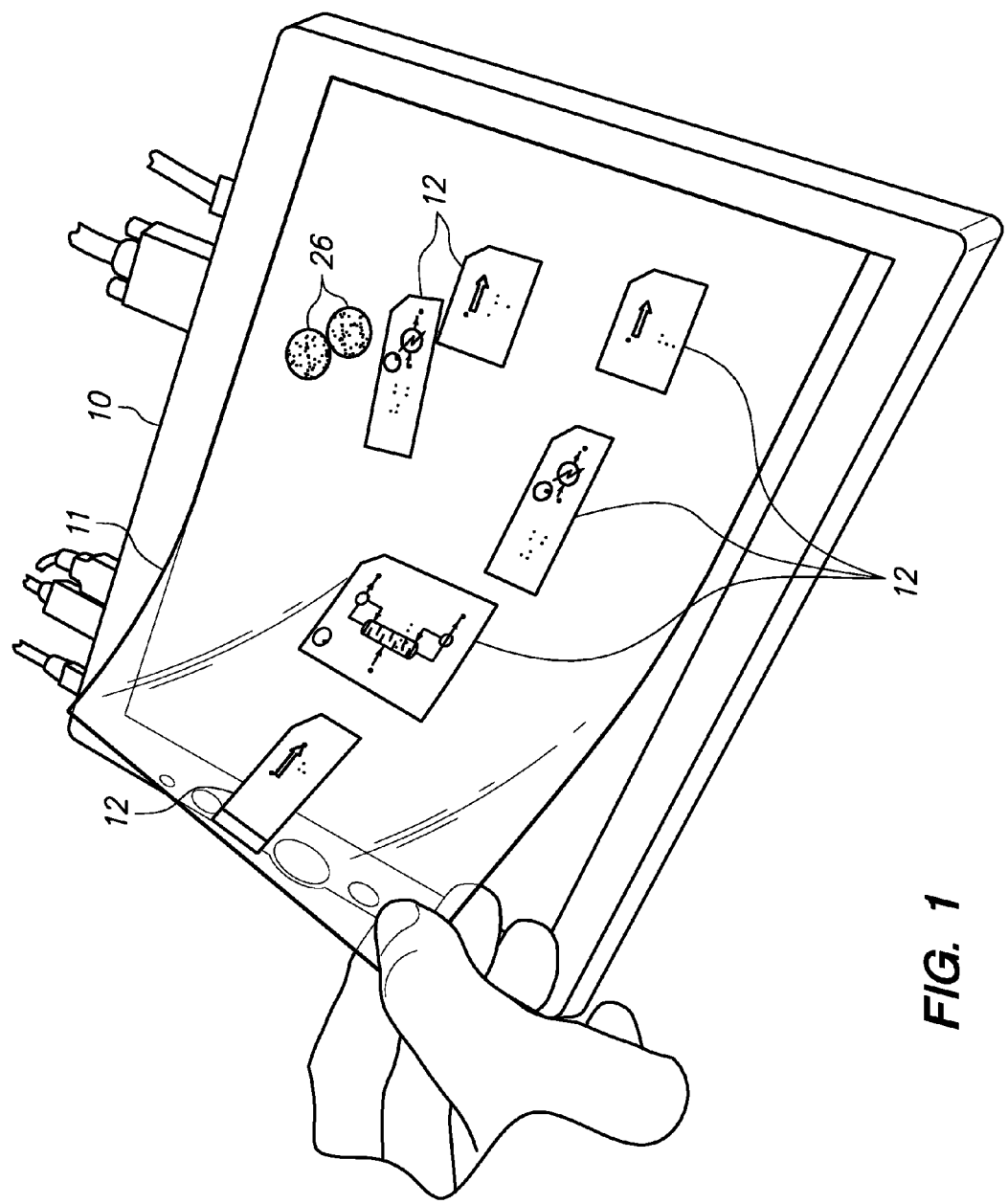
FIG. 1 is a photograph of a tablet personal computer (PC) with a design medium layer according to a preferred embodiment of the present invention.

Use of the tablet PC 10, as shown in FIG. 1, was more successful, and is therefore employed in the preferred embodiment of the present invention. The tablet PC registered interactions such as a mouse click not with a finger touch, but with the use of a special pen. This allowed the visually impaired student to use his or her fingers to "explore" the tactile representations and connection points without spurious clicks of the mouse. Moreover, both a right click and left click were possible using the pointing device, in this case, a pen. When the pen was within approximately 1 cm of the surface of the tablet screen, the pointer hovered over the pallet or finished design, allowing the user to perform certain actions. Specific to CHEMCAD, the user had the ability to hover in order to read various pop-up windows describing conditions such as flows, temperatures, pressures, and/or sizing of the plant components under the elevated pen point. The visually impaired student using a screen reader could easily read these pop-up windows much like his or her sighted counterparts, provided that a JAWS script file designed for this purpose was installed. Once the visually impaired design student had a tactile layout of the plant on a removable overlay 11, he or she could easily find and manipulate tactile representations 12, as shown in FIG. 1. Assuming the tactile representations 12 did not move, the student could easily find the tactile markers and perform various actions related to design and optimization of the process. Tactile representations may be made of various materials, but are preferably relatively inflexible and able to support embossing, hole-punching and the like. In a preferred embodiment, the tactile representations are made from a heavy acetate polymer with a second layer adhered thereto.

Figure 2:
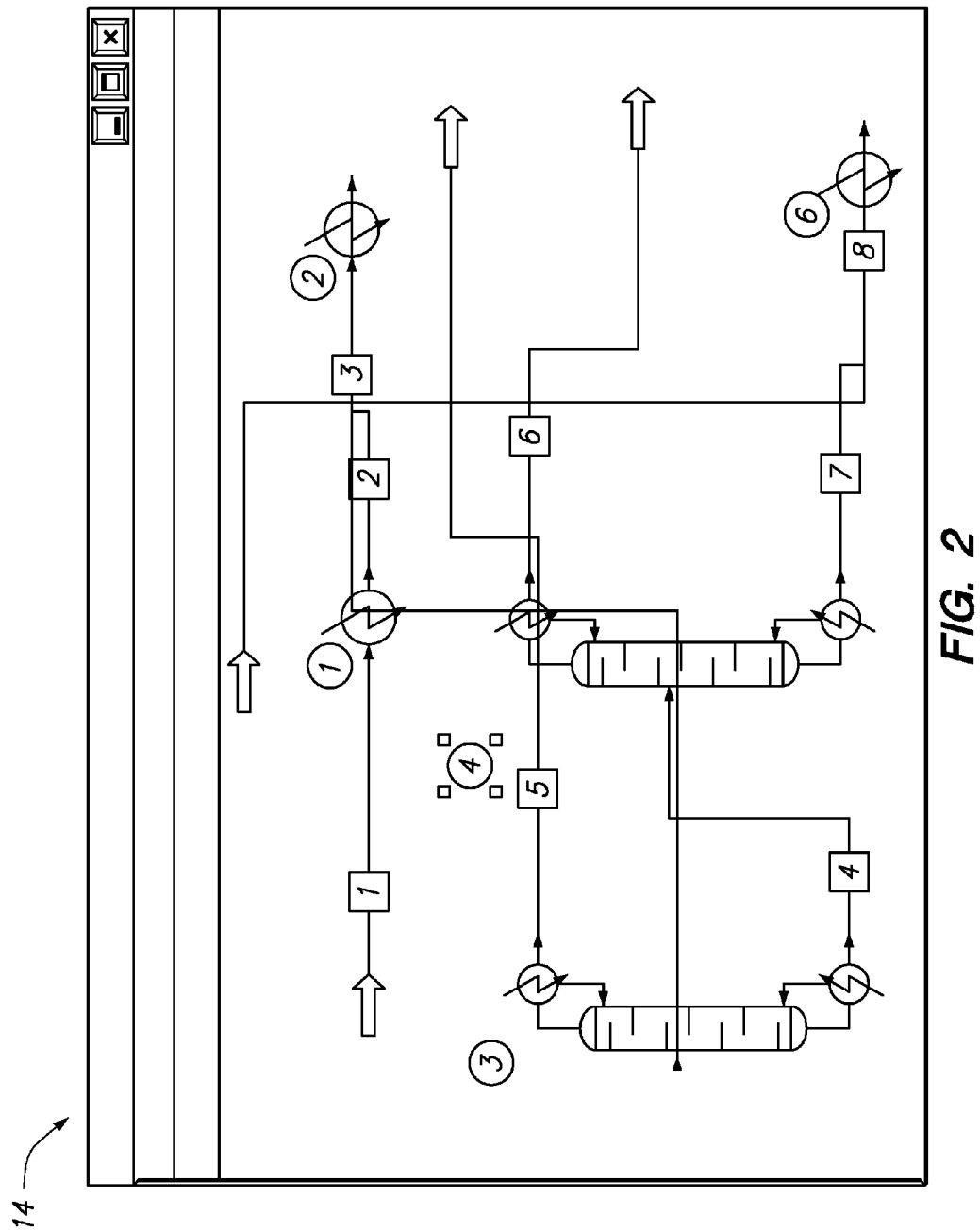
FIG. 2 is a screen image of a design for hydrocarbon fractionation built with a tactile-GUI according to a preferred embodiment of the present invention.

Layout of the plant via the building of the flowsheet involved two major tasks: (i) placing tactile representations of unit operations on the design medium, and (ii) indicating and connecting related unit operations with mouse actions within the tablet PC. This operation is depicted in FIG. 2, showing layout 14, as displayed on a screen for sighted persons. Audible cues embedded in CHEMCAD address the second of the tasks listed above. A comparison between sighted users and those with impaired vision can be made to explain the audible enhancements. A sighted user first decides where to make a connection by placing the cursor close to a port on an icon. The user then starts drawing the stream with a left click. Drawing continues until the cursor reaches a different type of port on another icon, and finally, the user connects the stream with a left click. In contrast, the visually impaired user must first locate the connection port on the tactile representation. The user then listens for the appropriate verbal indicator that signifies either an inlet or outlet port before performing a mouse click with the tablet PC pen.

Initially, reinforcement stickers such as those typically used to strengthen paper around a binder punch-hole were used as tactile representations of unit operations or icons. These stickers are adhesive, making design somewhat intuitive to the user. Since these reinforcement stickers have holes in the center, there is a convenient spot that acts as a tactile irregularity to indicate where the click could or should occur, that is, a landing or drop point for the icon. With the auditory feedback mechanisms built into CHEMCAD, the reinforcement sticker method worked well to connect small unit operation icons such as pumps, feeds, and products, since the drop point for a unit, and the feed and product ports are close together. With the stickers, one only had to search for the sound cue for an inlet or an outlet and drop the pen to click and subsequently place the icon on the screen.

The reinforcement sticker method was less effective, however, when more complicated unit operation icons such as mixers, distillation columns, or heat exchangers were incorporated into a design. With distillation columns, for example, there were several points where the cursor may be placed to make connections. A sticker with one central point did not achieve fine enough tactile control to allow a distillation column to be attached to a feed point and then discharge the bottoms and the tops of the column into two different parts of the plant. This shortcoming spurred the development of tactile stencils having multiple tactile irregularities for design of more complex process flow diagrams and computer simulations. A variety of tactile irregularities may be used, including holes, embossed patterns or depressions, bumps, and the like.

Figure 3:
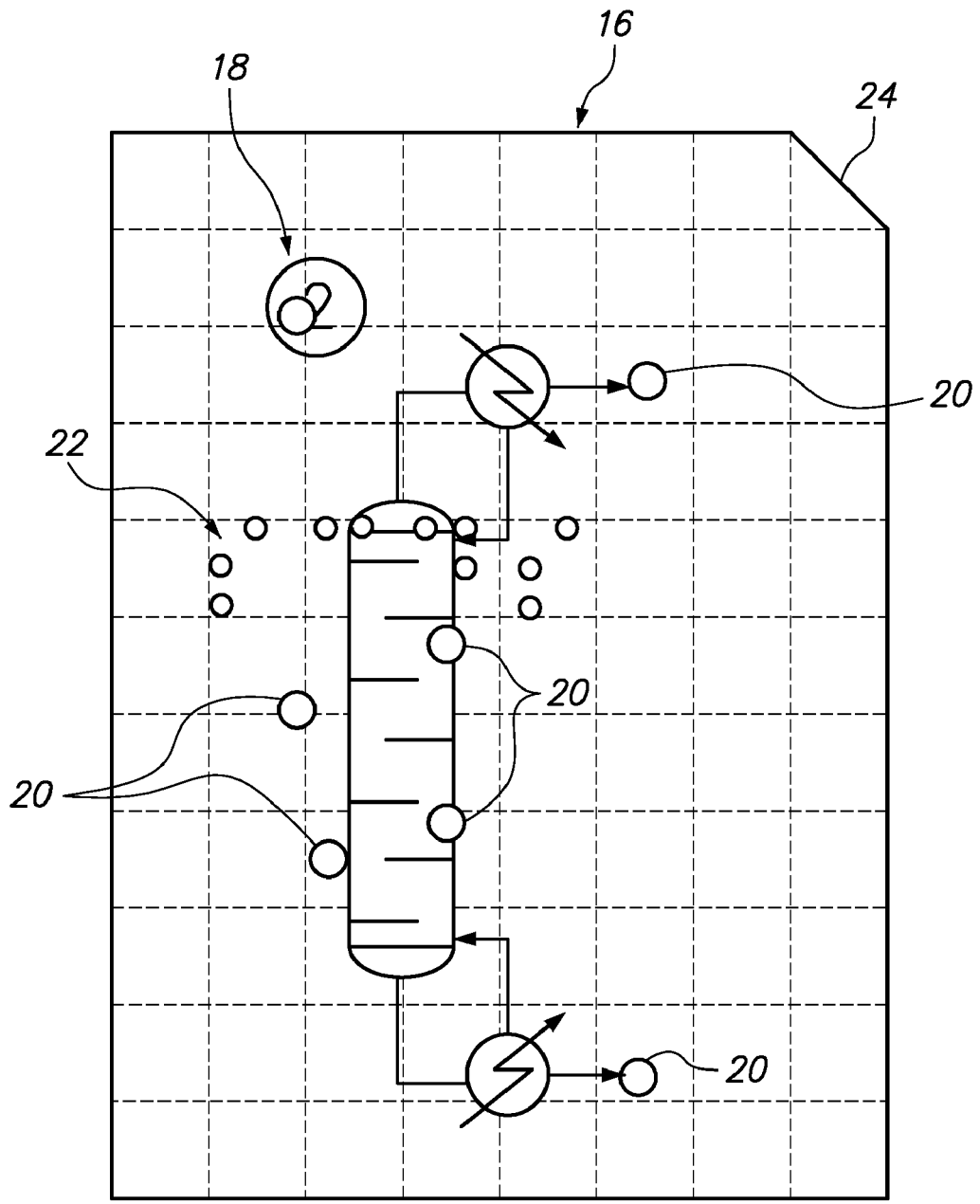
FIG. 3 is a tactile representation of a distillation icon according to a preferred embodiment of the present invention.

In the preferred embodiment, complex tactile stencils were designed to mimic the size of the onscreen icons, as shown in FIG. 3. As a convention, all tactile stencils 16 had a drop point or orientation marker 18 dedicated to the upper left-hand corner. Stencils 16 were printed out by using a 1:1 screen shot of the main pallet taken from CHEMCAD, sized to the screen of the tablet PC 10, and printed onto adhesive label paper. A careful mapping was made of the click actions associated with the icon drop point 18 and inlet and outlet ports 20. This was accomplished by overlaying a grid using a built-in CHEMCAD function. Stencils 16 were printed out on adhesive paper and placed on a sturdy material. A heavy acetate polymer that is relatively inflexible had been used as a backing for the tactile stencils. After the stickers were affixed to the backing material, holes were punched where the drop point 18 and ports 20 were indicated. Other tactile irregularities besides holes may be used, including an embossed pattern or depression or a bump in the tactile representation. Finally, Braille labels 22 were optionally embossed on the tactile stencil using a Perkins Brailler. The upper-right corner of the stencil was then removed to create orientation marker 24, allowing for proper orientation of the stencil on the screen overlay 11.

Combining the Braille and alphabetic print on stencil 16 was advantageous for several reasons. Notably, it enabled a sighted peer to see what the visually impaired student had placed on the design medium, thereby allowing for an initial troubleshoot of the design before it was transferred to the PC. A sighted person was able to fully interact with his or her visually impaired counterpart because both understood what the icon represented, in contrast to exclusively labeling the various elements with Braille. Alternately, the screen output could be mirrored to an external monitor using a projector, as depicted in FIG. 2.

Other problems that had to be solved included the choice of adhesive and design medium or overlay that was layered above the tablet PC screen 10. Since the visually impaired individual must rely on the fact that the drop points and associated inlets and outlets were in the same place on the screen every time to allow accurate connection of internal streams, it was vital to secure each stencil 16 onto the design medium 11. Double-sided tape was found to be the best choice for adhesion of stencils 12 to design medium 11 in the preferred embodiment. Transparent film was used for design medium 11 in order to allow a sighted individual to see through to the screen. Other suitable overlays may include transparencies (commonly made of cellulose acetate) of the sort commonly used with overhead projectors, polyacetate, or similarly transparent material. The overlay may fit within the tablet screen surface or may encompass the entirety of the tablet or other screen.

Affixed to all design mediums 11 were marked locations 26, as shown in FIG. 1, for two very important icons not accessible through menu commands: (i) the select unit op submenu icon and (ii) the stream editor icon. A click on the tactile representation of the select unit op submenu allowed the user to invoke a submenu that was navigated by the screen reader. This submenu allowed the visually impaired individual to select the unit operation icon of choice without having to search the cluttered visual pallet or place too many tactile elements on the transparency, creating confusion for the student. Another tactile dot marked the stream editor utility that provides connectivity and stitches the process together. These two marker locations 26 were represented with small, felt-covered stickers since a single, simple click invoked the respective functions.

The main hurdle presented by GUI-based technical software packages is the fact that the student or professional must manipulate graphics with the use of mouse actions to create tangible and working designs. Using a combination of imbedded audio cues and tactile representations allows a visually impaired student to operate CHEMCAD, a technical software package used in academia and industry, in the preferred embodiment of the present invention. The adaptations described herein could, in principle, be applied to any GUI-based technical package used in a classroom or professional setting. The visually impaired person may easily generate diagrams with an I/O system such as the tablet PC as outlined herein and within the scope of the present invention. Using an active design canvas such as the tablet PC according to a preferred embodiment of the present invention, a visually impaired student functions in a manner essentially equivalent to his or her sighted counterpart in the classroom.

The present invention has been described with reference to certain preferred and alternative embodiments that are intended to be exemplary only and not limiting to the full scope of the present invention as set forth in the appended claims.

What is claimed is:

1. A method of controlling an engineering design software application with a user interface comprising a touchscreen providing input to the engineering design software application and an overlay removably fittable onto the touchscreen, wherein the touchscreen comprises a plurality of spatially distinct points and is operable to display a plurality of engineering design elements, the method comprising the steps of:
   (a) identifying among the plurality of engineering design elements a first desired engineering design element to be input to an engineering design and displaying the first desired engineering design element on the touchscreen;
   (b) locating a first tactile representation corresponding to the first desired engineering design element, wherein the first tactile representation is removable from and repositionable upon the touchscreen;
   (c) placing the first tactile representation onto the overlay at a position above a first location where the first engineering design element is displayed on the touchscreen;
   (d) identifying among the plurality of engineering design elements a second desired engineering design element to be input to the engineering design and displaying the second desired engineering design element on the touchscreen;
   (e) locating a second tactile representation corresponding to the second desired engineering design element, wherein the second tactile representation is removable from and repositionable upon the touchscreen;
   (f) placing the second tactile representation onto the overlay at a position above a second location where the second engineering design element is displayed on the touchscreen;
   (g) identifying by touch and responsive non-visual cue an engineering design element output point on the first tactile representation;
   (h) identifying by touch and responsive non-visual cue an engineering design element input point on the second tactile representation; and
   (i) creating an engineering design by connecting the engineering design element output point on the first tactile representation and the engineering design element input point on the second tactile representation by means of tactile input to the touchscreen and responsive non-visual cue wherein a resulting connection is visually represented on the touchscreen by a displayed line.

2. The method of claim 1, wherein the user interface comprises a pointing device, and the steps of identifying an output point and identifying an input point and creating an engineering design are performed by the pointing device.

3. The method of claim 2, wherein said identifying an output point and input point steps comprise the step of generating audio cues.

4. The method of claim 2, wherein said locating a first and second tactile representation steps comprises the step of reading Braille characters embossed on a plurality of candidate tactile representations.

5. The method of claim 2, wherein said identifying an output point comprises the step of locating a tactile irregularity on the first tactile representation, and said identifying an input point comprises the step of locating a tactile irregularity on the second tactile representation.

6. The method of claim 1, wherein said first and second tactile representations comprise a selectively removable adhesive, wherein said placing a first tactile representation step comprises the step of adhering the first tactile representation to the overlay, and wherein said placing a second tactile representation step comprises the step of adhering the second tactile representation to the overlay.

7. The method of claim 2, wherein the first and second tactile representations each comprise an orientation marker, and wherein said method further comprises the step of orienting the first and second tactile representations on the overlay.

8. A user interface for an engineering design software application operable to generate a plurality of graphical user interface (GUI) elements each corresponding to engineering design elements, the user interface comprising:
 (a) a hardware surface providing input to the software application, said hardware surface comprising a touch-sensitive digital image display screen comprising a plurality of spatially distinct points;
 (b) a non-visual cue generated by the software application upon an interaction of a user with one of said spatially distinct points by means of which the user is informed whether that one of said spatially distinct points corresponds to one of an input and an output;
 (c) a removable, transparent overlay fittable onto the touch-sensitive digital image display screen; and
 (d) a plurality of tactile stencils each corresponding to one of the engineering design elements, wherein said tactile stencils are removable from and repositionable upon the removable overlay such that the tactile stencils may be positioned above a corresponding one of the engineering design elements appearing on the touch-sensitive digital image display screen, wherein each of the tactile stencils further comprise (i) at least one tactile irregularity corresponding to one of the input and the output; (ii) a touch-readable print identifying the one of the engineering design elements to which such one of the tactile stencils corresponds, and (iii) a visually-readable print identifying the one of the engineering design elements to which such one of the tactile stencils corresponds.

9. The user interface of claim 8, wherein the touch-sensitive digital image display screen is operable to display at least one of a plurality of connections between at least two of the engineering design elements.

* * * * *